(12) United States Patent
Tokhtuev et al.

(10) Patent No.: US 6,494,616 B1
(45) Date of Patent: Dec. 17, 2002

(54) MULTIPLEXED SENSOR ARRAY

(75) Inventors: Eugene Tokhtuev, Duluth, MN (US); Robert M. Carlson, Duluth, MN (US); Christopher J. Owen, Duluth, MN (US); Anatoly Skirda, Duluth, MN (US); Viktor Slobodyan, Duluth, MN (US); Alexander Tokhtuev, Duluth, MN (US)

(73) Assignee: Regents of the University of Minnesota, Minneapolis, MN (US)

( * ) Notice: Subject to any disclaimer, the term of this patent is extended or adjusted under 35 U.S.C. 154(b) by 59 days.

(21) Appl. No.: 09/632,405

(22) Filed: Aug. 4, 2000

(51) Int. Cl.[7] .............................. G01K 3/00; G01K 7/01
(52) U.S. Cl. ...................... 374/137; 374/142; 374/143; 374/166; 374/183; 340/870.11; 340/870.13
(58) Field of Search .................................. 374/137, 142, 374/143, 166, 183; 340/870.11, 870.13, 870.16, 870.17; 324/685, 721; 73/170.28, 170.29, 170.31, 170.32, 170.33, 170.34

(56) References Cited

U.S. PATENT DOCUMENTS 2,509,215 A * 5/1950 Craig et al. .............. 340/870.1

(List continued on next page.)

FOREIGN PATENT DOCUMENTS

| JP | 57-73639 | * | 5/1982 | .................. 374/137 |
| SU | 934252 | * | 6/1982 | .................. 374/166 |
| SU | 1545095 | * | 2/1990 | .................. 374/137 |

OTHER PUBLICATIONS

Analog Devices, "Two–Terminal IC Temperature Transducer", AD590 Product Brochure (REVB), 1997 (9 pages).
Pisarev, S.V., "Internal waves measurements with distributed temperature sensors near Arctic Ocean continental shelf margin," Oceans '95. MTS/IEEE Proc. vol. 2, Oct. 1995, pp. 949–955.*
Skinner, J.D.; de Moustier, C., "A specialized CT sensor for real–time input of sea–surface sound speed to a multibeam echo–sounder," Oceans '95. MTS/IEEE Proc. vol. 1, 1995, pp. 189–194.*
Darabeigi et al., "Flexible Multiplexed Surface Temperature Sensor", NASA Tech. Briefs Feb. 1995, p. 36.*
Jung, Walter G., "Sense temperature remotely with IC temperature./current transducers", Electronic Design, Sep. 1978, p. 138.*
Timko, "A Two–Terminal IC Temperature Transducer", IEEE Journal of Solid State Cicuits, vol. SC–11, No. 6, Dec. 1976, pp. 784–788.*

*Primary Examiner*—Christopher W. Fulton
*Assistant Examiner*—Stanley J. Pruchnic, Jr.
(74) *Attorney, Agent, or Firm*—Westman, Champlin & Kelly, P.A.

(57) ABSTRACT

A sensor array includes a plurality of sensors connected to two or more groups of wires such that individual sensors can be addressed. No two sensors are connected to the same two wires. The groups of wires are connected to multiplexers or the like to address particular wires connecting a unique sensor. Dramatically improved accuracy is obtained by connecting rectifiers in series with the sensors to significantly reduce reverse current through a sensor that can lead to significant errors. In some preferred embodiments, the array includes a plurality of temperature sensors, especially for use in measuring temperature at different depths in a body of water

43 Claims, 11 Drawing Sheets

U.S. PATENT DOCUMENTS

| | | | |
|---|---|---|---|
| 3,459,925 A | * 8/1969 | Goosey et al. | 374/167 |
| 3,483,749 A | * 12/1969 | Francis | 374/142 |
| 3,649,877 A | * 3/1972 | Friedman et al. | 374/143 |
| 4,114,446 A | * 9/1978 | Walsh | 374/183 |
| 4,234,872 A | * 11/1980 | Halder | 340/825.94 |
| 4,557,608 A | * 12/1985 | Carver | 374/183 |
| 4,558,217 A | 12/1985 | Alves | |
| 4,676,664 A | * 6/1987 | Anderson et al. | 374/136 |
| 4,861,979 A | 8/1989 | Tardy et al. | |
| 4,875,042 A | 10/1989 | Oku et al. | |
| 4,881,071 A | * 11/1989 | Monterosso et al. | 340/870.13 |
| 5,261,747 A | * 11/1993 | Deacutis et al. | 374/137 |
| 5,377,030 A | * 12/1994 | Suzuki et al. | 324/770 |
| 5,426,428 A | * 6/1995 | Binder et al. | 340/870.17 |
| 5,483,800 A | 1/1996 | Schrage | |
| 5,672,008 A | 9/1997 | Bonniau et al. | |
| 5,691,957 A | * 11/1997 | Spiesberger | 73/170.29 |
| 5,902,044 A | * 5/1999 | Pricer et al. | 374/137 |
| 5,991,026 A | 11/1999 | Kluth et al. | |
| 6,091,837 A | * 7/2000 | Dinh | 374/141 |
| 6,147,931 A | * 11/2000 | Seaman et al. | 374/137 |
| 6,217,211 B1 | * 4/2001 | Hesky | 374/137 |

* cited by examiner

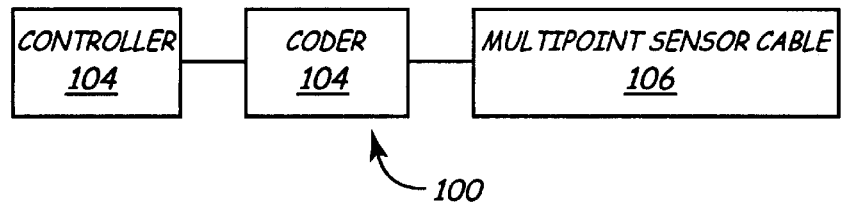
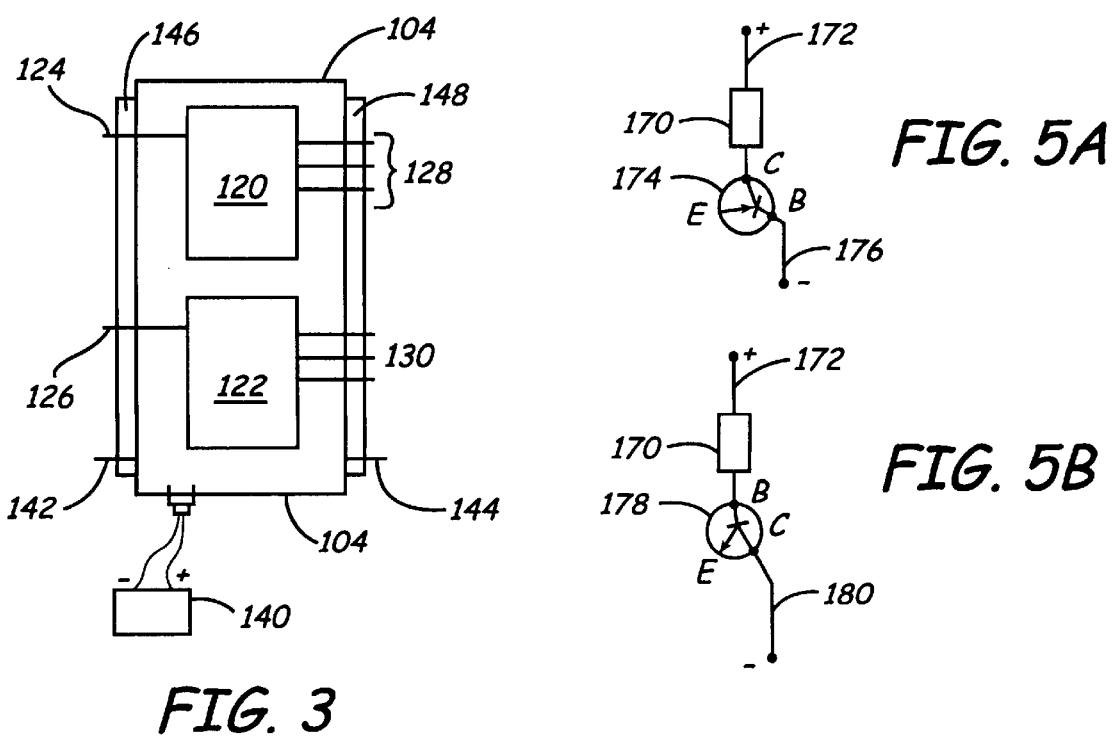

MULTIPLEXED SENSOR ARRAY

BACKGROUND OF THE INVENTION

The invention pertains to a sensor array suitable for the simultaneous measurement of parameters, such as temperature, at a series of points connected along a cable. In particular, the invention relates to a sensor array that can perform real time monitoring of a condition measurable with a sensor suitable for the determination of a spatial profile of the condition.

Real time monitoring of a variety of parameters is important in a variety of contexts. For example, real time temperature monitoring of large industrial machinery or integrated systems have many important applications in industry. Significant applications of temperature monitoring include, for example, monitoring of industrial equipment at power plants, air craft testing, evaluation of the efficiency of heating and cooling systems, monitoring of temperature distribution with depth in natural and artificial bodies of water in oceanography and limnology, and control for aquaculture. For some of these applications, the temperature sensors can be spread out over distances of hundreds to thousands of meters. To provide the desired temperature readings, thousands of temperature sensors spread out through the system can be used.

SUMMARY OF THE INVENTION

In a first aspect, the invention pertains to a sensor array comprising a power supply with two poles, a plurality of sensors, a plurality of rectifiers, a first multiplexer connected to one pole of the power supply, a second multiplexer connected to a second pole of the power supply, a first group of wires connected to the first multiplexer and a second group of wires connected to the second multiplexer. Generally, each sensor is connected to one wire of the first group of wires and one wire of the second group of wires. Preferably, no two sensors are connected to an identical two wires, and a rectifier is connected in series with each sensor.

In another aspect, the invention pertains to a method of performing measurements with a plurality of sensors, the method comprising selecting an address for a first multiplexer and a second multiplexer to access a single sensor on an array of sensors. Each sensor is uniquely connected to a pair of wires with one wire of the pair from a first group of wires and the second wire of the pair from a second group of wires. The first group of wires are connected to the first multiplexer and the second group of wires are connected to the second multiplexer. In preferred embodiments, a rectifier is connected in series with each sensor.

In a further aspect, the invention pertains to a sensor array comprising a power supply with two poles, a plurality of sensors, a first multiplexer connected to one pole of the power supply, a selector connected to a second pole of the power supply, a first group of wires connected to the first multiplexer and a second group of wires connected to the selector. Each sensor is connected to one wire of the first group of wires and one wire of the second group of wires and wherein no two sensors are connected to an identical two wires. The selector supplies power to a plurality of the wires of the second group while connecting only one wire of the second group to an output line based on an address provided at an address connection.

Moreover, the invention pertains to a matrix sensor array comprising a power supply with two poles, a plurality of sensors, at least three multiplexers with each multiplexer connected to an output of the power supply, a plurality of groups of wires with one group of wires connected to each multiplexer. Each sensor is connected to one wire of one group of wires and one wire of a different group of wires, and no two sensors are connected to an identical two wires.

Furthermore, the invention pertains to an underwater detection grid comprising a plurality of temperature sensors, a plurality of orientation sensors, a first multiplexer, a second multiplexer, a first group of wires connected to the first multiplexer and a second group of wires connected to the second multiplexer. Each temperature sensor is associated with an orientation sensor. Each temperature sensor is connected to one wire of the first group of wires and one wire of the second group of wires, and no two temperature sensors are connected to an identical two wires.

BRIEF DESCRIPTION OF THE DRAWINGS

FIG. 1 is a schematic diagram of a device that provides measurements from a sensor array.

FIG. 2 is a schematic perspective view of an embodiment of a process to be used in the measurement apparatus.

FIG. 3 is a top view of a decoder.

FIG. 5A is a schematic diagram showing two contacts of a p-n-p transistor connected in series with a sensor.

FIG. 5B is a schematic diagram showing two contacts of a n-p-n transistor connected in series with a sensor.

DETAILED DESCRIPTION OF THE ILLUSTRATIVE EMBODIMENTS

Figure 4A:
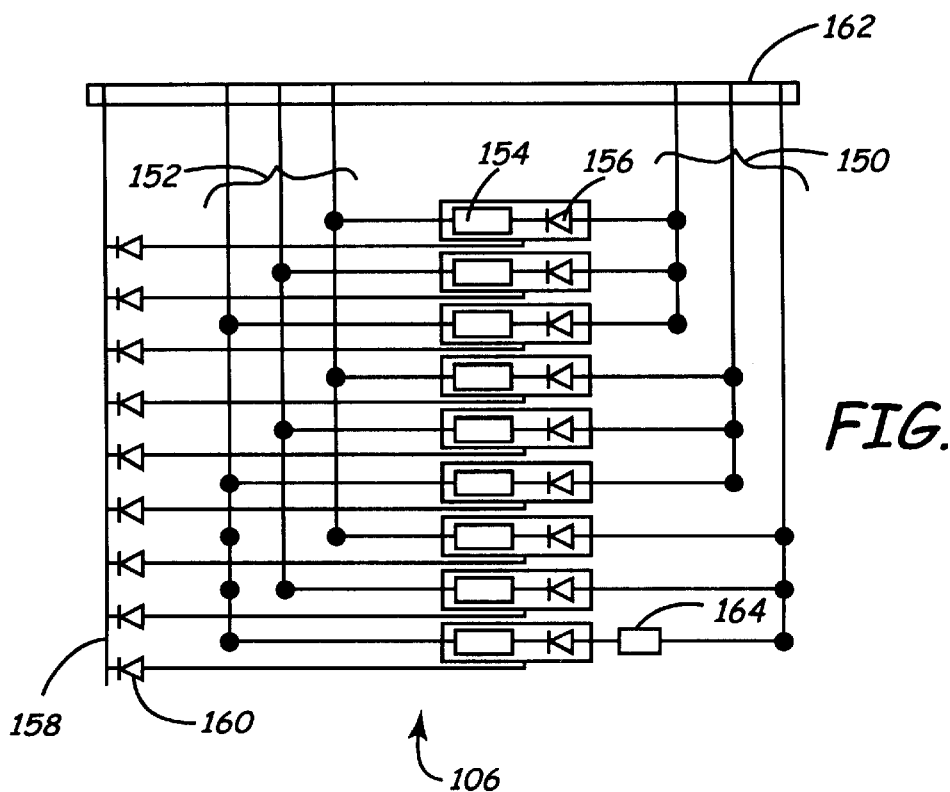
FIG. 4A is a schematic diagram of a sensor array cable including an orientation sensor in series with a sensor.

It has been discovered that a sensor array can be constructed to provide parameter measurements using a large number of sensors spread along an array with a greatly reduced number of connections, while achieving very high accuracy. Access to a selected sensor is performed using two or more multiplexers that allow selective access to the sensors. In this way, all of the sensors can be accessed sequentially, as desired. Even though the number of connections is greatly reduced, the array provides a high degree of accuracy. These arrays are particularly convenient for the measurement of temperature distributions in bodies of water, although they are also advantageous for application in other industrial settings.

The array includes a series of sensors connected in a matrix by wires to a power source through at least two multiplexers. To effectively measure a distribution of the physical parameter measured, the sensors are physically spread out with each sensor generally located at a spaced apart location relative to the other sensors, although multiple sensors can be placed at the same location to provide more accuracy. The sensor array can cover hundreds or thousands of meters for the generation of a distribution of sensor readings. Alternatively, the sensors can be located close to each other to produce a fine distribution of measurements.

In preferred embodiments, the array includes a controller, a coding device, a power source and a multi-point sensor cable. The controller generally includes a processor and an analog-to-digital (A/D) converter. The coding device generally includes two or more multiplexers. The coding device is connected to the power source, the processor and the multi-point sensor cable. The multi-point sensor cable connects to the power source through the multiplexers. The multi-point sensor cable generally includes a collection of sensors connected by wires to the multiplexers.

As described further below, in two dimensional matrix embodiments, 2P wires can be used to connect up to $N=P^2$ sensors. For example, a 20-wire cable can connect 100 sensors. The 20 wire cable would be connected to two 10-input multiplexers. While the discussion focuses on the use of two multiplexers, a single multiplexer can be replaced by multiple multiplexers with smaller capacity. For example, a 50 connection multiplexer can be replaced with two 25 connection multiplexers with appropriate modification of the connections to and the programming of the processor. Furthermore, sensor arrays with higher dimensional connection matrices can be constructed with even greater reductions in the number of connections. At least one multiplexer is needed for each dimension. Also, additional multiplexers can be used to preheat sensors prior to making a measurement.

In preferred embodiments, the multi-point sensor cable further includes a plurality of diodes, with at least one diode per sensor. Each sensor is connected in series with a diode between two wires. The diode, preferably a rectifier diode, inhibits reverse current flow through a sensor. In preferred embodiments, the effect of the diode can be obtained by connecting two poles of a transistor in series with the sensor. The commercially available transistors can provide lower reverse currents than readily available diodes, as described further below. Transistors, however, may cost more than a diode. Reverse current through the sensor can result in measurement errors. Thus, the use of diodes/transistors results in a large and surprising increase in measurement accuracy.

In a sensor array with two dimensional matrix connections, the wires in the cable are divided into two groups. A first group of wires connected to one multiplexer, and the second group of wires connects to a second multiplexer. Each sensor is connected to one wire of the first group and one wire of the second group. However, no two sensors are connected to the same two wires. In the most efficient arrangement, there are 2P wires in each group of wires, with P sensors connected to each wire. Then, P×P sensors can be hooked up to the 2P wires without any two sensors connected to the same two wires. This arrangement can be called a 2-dimensional connection matrix. Fewer than $P^2$ sensors can be connected to the same number of wires, if desired.

For example, if sensors 1 through P are connected to wire 1 of the first wire group, they can be connected sequentially to wires 1 through P of the second wire group such that no two sensors are connected to the same two wires even though they are connected to the same wire in the first group. Similarly, sensors P+1 to 2P can be connected to the second wire of the first group of wires and sequentially to wires 1 through P of the second group of wires such that no two sensors are connected to the same two wires. This process can be continued to connect all $P^2$ sensors without any two sensors having the exact same connection to the two wires. Any order of connection is acceptable as long as no two sensors are connected to the same two wires.

Connection arrays of higher dimension can be used to reduce the number of wires further for sensors that have more than two terminals or by the incorporation of a switch as a replacement for an additional terminal. There is at least one group of wires and one multiplexer for each dimension of the connection matrix. For example, in a three dimensional connection matrix, 3×N wires in three groups can be used to connect $N^3$ sensors through at least three multiplexers. For example, 3 groups of four wires can be used to connect 64 sensors with three multiplexers having four connections each. Similarly, in a four dimensional connection matrix with sensors having four terminals, 4×M wires in four groups can be used to connect $M^4$ sensors through at least four multiplexers. The process can be continued to higher dimensions. No two sensors are connected to the same set of wires. One address is supplied to each multiplexer to uniquely address each sensor.

The sensors can be any type of current-type sensor. In other words, the response of the sensor alters the current flowing through the sensor, generally by varying the electrical resistance. Thus, when a voltage is applied across the sensor, the resulting current can be used to extract the relevant information. In addition, voltage sensors with three or more terminals can be used in a two dimensional matrix connection array or a higher dimensional connection array.

The sensor is a transducer since an environmental condition is transduced to an electrical response. Suitable sensors include, for example, temperature sensors, pressure sensors, strain sensors, and the like. Pressure sensors can be used as altitude/depth sensor with appropriate calibration.

In some embodiments, the multi-point sensing cable further includes a position or orientation sensor connected in series with the transducer/sensor. In these embodiments, each sensor for the measurement of an environmental condition preferably is associated with a position sensor such that the position of each temperature sensor can be determined at the time that the temperature is measured. Using a position/orientation sensor, orientation of the cable as well as the temperature or other parameter can be evaluated in real time. In one preferred embodiment, the orientation sensor is connected such that no temperature reading is provided by a sensor if the sensor is lying on a surface.

The sensors arrays described herein provide an efficient way to connect a large number of sensors with a small number of wires without sacrificing accuracy. Because of the high accuracy of the sensor array, the sensor array can be convenient to use even with a small number of sensors. However, the greatest advantages are realized with a larger number of sensors. Thus, the array generally includes at least about 16 sensors, and can easily include at least about 64 sensors or at least about 100 sensors.

Additional multiplexers can be used to speed the measurement process by preheating sensors in anticipation of performing a measurement. Once a sensor is accessed by inputting its address to the multiplexers, it may require a few seconds for the sensor to warm-up before a stable reading can be obtained. This poses no problems since the processor can monitor the reading until there is no further change, or the processor can be programmed to wait an appropriate period prior to obtaining the reading. However, this procedure can be speeded up a significant amount by warming up one sensor while a second sensor is being read.

To perform the separate warming step, a separate multiplexer is needed to control the flow of the current for warming-up the sensor. The additional multiplexer can be connected to a separate set of wires leading to the sensors, or the additional multiplexer can be connected along with one of the original multiplexers to the group of wires used to read the sensors.

To access a particular sensor, each multiplexer is instructed to access one of the group of wires connected to it. The two wires selected, one connected to each of the multiplexers, provide a voltage across only one of the sensors. Diodes/transistors prevent current flow through multiple sensors between the two activated wires. Thus, the processor can sequentially access each of the sensors in a selected order over a selected time period. The sensors cannot be accessed faster than the response time for making an accurate measurement using one sensor. Therefore, the switching rate between different sensors cannot be performed too quickly, where the maximum rate depends on the characteristics of the sensors.

The sensor arrays described herein can be used in any number of contexts. Specifically, the sensor arrays can be used in any application that requires an array of sensors. In some preferred embodiments, the sensor array is used to distribute temperature sensors over a particular region. In some embodiments of particular interest, the sensor array is used to measure the temperature distribution in a body of water. The sensor array can be dragged behind a boat or the like, or the sensor array can be secured to a fixed location. In one particularly preferred embodiment, each position along the array has a temperature sensor and a depth sensor, each separately connected to the wires of the array. At the end of the sensor array cable, a hydrophone can be hooked up. The temperature reading can be used to correct the reading of the hydrophone since the speed of sound in water depends on the water temperature.

A. Array Apparatus

The sensor array as described herein provides a relatively low cost and convenient design while yielding very accurate measurements of a physical parameter. The array includes a plurality of sensors that are attached to wires in a way to reduce the number of wires, such that a large number of sensors can be used without increasing the number of wires to correspondingly large levels, which can become burdensome. The wires connecting the sensors are organized into groups with the wires from a group going to one or more multiplexers. Each sensor is attached to two wires from two distinct groups. To address each sensor uniquely, no two sensors are connected to the identical two wires.

In a sensor array with a two dimensional connection array, each. sensor is attached to two wires from two groups of wires, which connect the sensors to a power supply through two multiplexers. One group of wires is connected to one pole of a power supply through a multiplexer while the other group of wires is connected to the other pole of the power supply through another multiplexer. If the sensors are attached to maximize the number of sensors uniquely addressable with the number of wires available, 2P wires can be used to connect up to $N=P^2$ temperature sensors. For example, a 20-wire cable can connect 100 temperature sensors. Similarly, a 200-wire cable can be used to connect 10,000 temperature sensors.

More generally, the wires within the cable are divided into two unequal groups with M and N wires, respectively. The number of wires in each group can be but is not necessarily equal. The total number of sensors is M×N. The maximum number of sensors per wire can be used when the wires are divided into two groups as equally as possible. Also, there may be additional wires within the cable that are not part of the two groups used to address the sensors. These additional wires may be output lines, or they may provide connections for additional devices.

Also, the sensor wires can be grouped into more than two groups to form higher dimensional matrix connection arrays. To take full advantage of the higher dimensionality, the sensor should have a number of terminals equal to or greater than the dimension of the matrix connection array. A terminal for the sensor can be artificially introduced by inclusion of a switch.

Each group of wires is connected to at least one multiplexer for addressing the sensors. Assuming that the wires are equally divided into I groups with J wires each, a total of $J^I$ sensors can be uniquely addressed. The sensors are connected such that no two sensors are connected to the same two wires. Two multiplexers are connected to the power supply. Additional power supplies can be connected to output wires or to switch activating voltages. A specific three dimensional matrix connection array is described further below.

The sensors preferably are located in a configuration such that each sensor or subset of sensors measures a physical condition at a particular location. Inclusion of position sensors in association with the sensors provides for identification of the position of a particular sensors, if the sensor is not at a fixed location.

In a two dimensional matrix connection array, the sensors are connected to the two groups of wires such that two addresses can be used together to select one particular sensor. One group of wires is connected to one multiplexer, and the other group of wires is connected to a second multiplexer. Providing one address to one multiplexer selects one wire of that group while providing an address to the second mutliplexer selects one wire of the second group. Thus, the sensors are preferably connected such that no two sensors are connected to the same two wires, although a plurality of sensors generally are connected to any one wire.

In preferred embodiments, a sensor array 100 include a controller 102, a coder 104 and a multi-point sensor cable 106, as shown in FIG. 1. Referring to FIG. 2, controller 102 generally includes a digital processor 110 with an appropriate display or other output device 112, an analog-to-digital (A/D) converter 114 and a connection 116 to coder 104. Suitable processors include, for example, personal computers and workstations that use operating systems, such as Windows®, MacIntosh®, UNIX®, or LINUX®. Other suitable embodiments include lower power processor chips that are built into a specific controlled device. The controller device can store and/or display the data from the sensors. If the data is stored, it can be downloaded to another processor, such as a personal computer or workstation for further analysis, as desired. A suitable processor is a WinSystem™ processor (WinSystems Inc., Arlington, Tex.) single board computer, with a built-in 12-bit A/D converter.

The A/D converter can be incorporated into the processor on a board or it can be external to the processor. The A/D converter generally is selected to provide a desired level of accuracy over the current range expected from the sensors. Appropriate biasing can be used to shift the response of the A/D converter.

Other connections between processor 110 and coder 104 are shown as wire 118. Wire 118 provides for addressing a particular sensor. Connections between processor 102 and coder 104 can involve additional components to provide appropriate signals to the coder. Connections with the processor can be based on standard protocols, such as, parallel connections, serial connections, such as an RS232 connection, USB connections and fire wire connections.

Referring to FIG. 3, the coder 104 includes, at least, two multiplexers 120, 122. Although either analog or digital multiplexers can be used, analog multiplexers are preferred because of lower resistance and broader voltage ranges. Suitable analog multiplexer includes, for example, a DG408 DJ 8-channel multiplexer available from Newark Electronics, Minneapolis, Minn. Multiplexers 120, 122 connect to processor 102 by address connections 124, 126, respectively. If the addresses are provided in binary form, U bits can be used to address $2_U$ wires. The addresses can be straightforwardly provided in an appropriate format for the particular multiplexer.

Multiplexer 120 is connected to the multi-point sensor cable 106 by way of a first group of wires 128, and multiplexer 122 is connected to the multi-point sensor cable 106 by way of a second group of wires 130. In preferred embodiments, each group of wires has enough wires such that the product of the two numbers of wires in the two groups is equal to or greater than the number of sensors. Each sensor is connected to a wire from each group.

Each group of wires can be connected to a plurality of multiplexers if a single multiplexer does not have sufficient capacity. The group of multiplexers connected to a group of wires then functions as a single multiplexer even though there is more than one physical component. The discussion herein follows for the plurality of mulitplexers connected to the single group if the multiplexers connected to a single group of wires were considered to function as a single multiplexer. Additional multiplexers can also be used to form higher dimensional matrix connection arrays. Furthermore, additional multiplexers can be used to preheat the sensors for more rapid measurements.

Coder 104 is also connected to a power supply 140. Power supply 140 can be, for example, a battery or a transformer connected to line voltage. Generally, a DC power supply is used. The voltage of the power supply can be adjusted to an appropriate range for the sensor. Power is supplied to the sensors from power supply 140 through multiplexers 120, 122. Generally, the positive voltage is connected to one multiplexer and the negative voltage is connected to the other multiplexer. One of the multiplexers can be connected to the power supply through a load, i.e., a resistor, as described further below.

An output line 142 connects coder 104 with A/D converter 114. Output line 142 is connected to the negative power line through a resistor. The resistor is selected to yield a desired range for the output voltage. For example, for a voltage range from 0–10 volts, a resistance of 10 kilo-ohms yields a maximum output of 1 milliamp. For two wire sensors, output line 142 is directly connected to one multiplexer. With three wire sensors, output line 142 is connected with optional line 144 of multi-point sensor cable 106, and the negative voltage line of the power source is directly connected with a multiplexer. Coder 104 can include connectors, such as pin connectors 146, 148 of FIG. 3, to facilitate connection of the components.

Referring to FIG. 4, multi-point sensor cable 106 includes a first group of wires 150, a second group of wires 152, a plurality of sensors 154, preferably a plurality of rectifiers 156, an optional signal wire 158 associated with a second group of rectifiers 160, connector 162 and optional position sensors 164. As shown in FIG. 4, nine sensors 154 are connected to three wires in the first group of wires 150 and three wires in the second group of wires 152. Each sensor is connected to one wire in each group.

Rectifiers 156 permit current flow only in the forward direction and resist any current flow in the reverse direction. Reverse current through a sensor can result in measurement errors. Specifically, due to current flow through multiple sensors, one sensor could experience temporary reverse current flow when current is applied to a particular pair of wires, except for the presence of the rectifier. This multiple path current is detected as net current that looks like it is originating from the specifically addressed sensor. Using the rectifiers to prevent reverse currents and corresponding spurious net currents, considerable improvement in the accuracy of the measurements result.

Rectifiers can be, for example, diodes or transistors connected at two contacts. In preferred embodiments, the rectifier provides a maximum reverse current at a voltage of 10 volts of preferably less than about $1 \times 10^{-8}$ Amps, more preferably less than about $2 \times 10^{-9}$ Amps, even more preferably less than $5 \times 10^{-10}$ Amps, and even more preferably less than about $1 \times 10^{-11}$ Amps. The sensors generally operate at voltages ranging from about 1 volt to about 20 volts, and typically from about 2.5 volts to about 15 volts. Suitable diodes include, for example, model 1N4004 diode available from Digi-Key, Corp., Thief River Falls, Minn., with a reverse current limit of $1.1 \times 10^{-9}$ Amps.

Extremely low reverse currents can be obtained with a transistor connected through its base and collector in series with the sensor. The emitter contact remains disconnected. In bipolar transistors, the collector contact is a rectifying contact. Thus, p-n-p and n-p-n transistors can be connected as indicated in FIGS. 5A and 5B. In FIGS. 5A and 5B, sensor 170 is connected to a wire 172 leading to a positive voltage pole of a power supply through the multi-point sensor array cable. In FIG. 5A, sensor 170 is connected to a collector (C) contact of a p-n-p transistor 174 with the base (B) connected to a wire 176 leading to the negative voltage pole of the power supply through the cable. The emitter contact of transistor 174 is not connected. In FIG. 5B, sensor 170 is connected to a base (B) contact of a n-p-n transistor 178. Transistor 178 has a collector (C) contact connected to a wire 180 leading to the negative pole of the power supply through the cable. Suitable transistors (available from Digi-Key Corp., Thief River Falls, Minn.) include, for example, model PN 3566 with a reverse current at a voltage of 10 volts of about $0.300 \times 10^{-9}$ Amps, ZTX601B with a reverse current of $7 \times 10^{-12}$ Amps, PN 2907 with a reverse current of $2 \times 10^{-12}$ Amps and MPSA13 with a reverse current of $1 \times 10^{-12}$ Amps. Using a diode with a reverse current of $1.1 \times 10^{-9}$ Amps, an accuracy for a 1000 temperature sensor array is about 0.1° C., while with a transistor having a reverse current on the order of about $1 \times 10^{-11}$ Amps, it should be possible to obtain accuracies of about 0.01° C.

Sensors 154 can be all of the same type or they can include sensors of different types. Suitable sensors were described above. Preferred sensors include temperature sensors. Suitable temperature sensors include, for example, thermocouples and semiconductor temperature transducers. Suitable two wire temperature sensors include, for example, model AD590, from Analog Device, Norwood, Mass. A 64 sensor array was constructed with AD590 sensors and 1N4004 diodes. Measurements were obtained with an accuracy of better than 0.03° C.

In preferred embodiments, one rectifier 156 is placed in series with each sensor 154 in the connection between the wire from group 150 and the wire from group 152. Optional signal wire 158 and optional rectifiers 160 are used when three wire sensors are used, as described further below.

First group of wires 150 are connected to the first group of wires 128 in coder 104. Similarly, second group of wires 152 are connected to the second group of wires 130 in coder 104. Signal wire 158 is connected to line 144. Connections between cable 106 and coder 104 can be facilitated using a connector 162 on cable 106.

Figure 6:
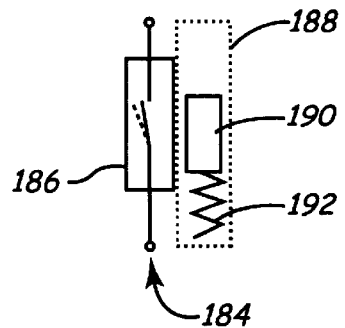
FIG. 6 is a schematic view of a orientation/position sensor.

If desired, a position/orientation sensor 164 can be associated with temperature sensors 154. A simple form of an orientation sensor is shown in FIG. 6. Orientation sensor 184 includes a reed relay 186 connected to a glass tube 188. Glass tube 188 includes a magnet 190 and a spring 192. When orientation sensor 184 is up-right, the weight of magnet 190 compresses spring 192 such that magnet 190 is in proper position to close relay 186 allowing current to flow. When orientation sensor 184 is turned on its side, spring 192 pushes magnet 190 toward the top of glass tube 188 such that magnet 190 is not in position and relay 186 opens preventing the flow of current.

Figure 4B:
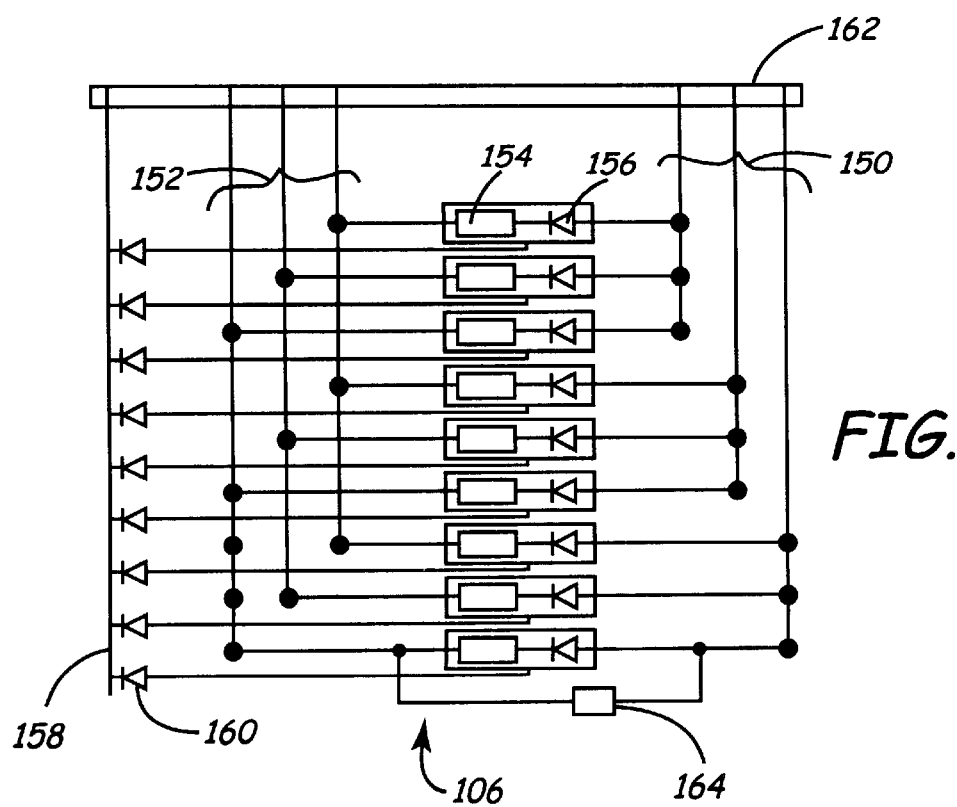
FIG. 4B is a schematic diagram of a sensor array cable including an orientation sensor in series with a sensor and an orientation sensor in parallel with the sensor.

As shown in FIGS. 4A and 4B, orientation sensor 164 is associated with only a single sensor 154, however, orientation sensors preferably are associated with each sensor 154. Orientation sensors 164 can be placed in series or in parallel with sensor 154. As shown in FIG. 4A, one position sensor 164 is shown in series. In FIG. 4B a position sensor 164 is shown in parallel. Only one orientation sensor, either in series or in parallel, should be used. If the orientation sensor is in series, the reading of the corresponding sensor 154 is only transmitted when orientation sensor 164 is sufficiently up-right that the relay is closed. If orientation sensor 164 is connected in parallel with the sensor, the reading of the corresponding sensor 154 is only transmitted when orientation sensor 164 is sufficiently horizontal that the relay is open.

Figure 7:
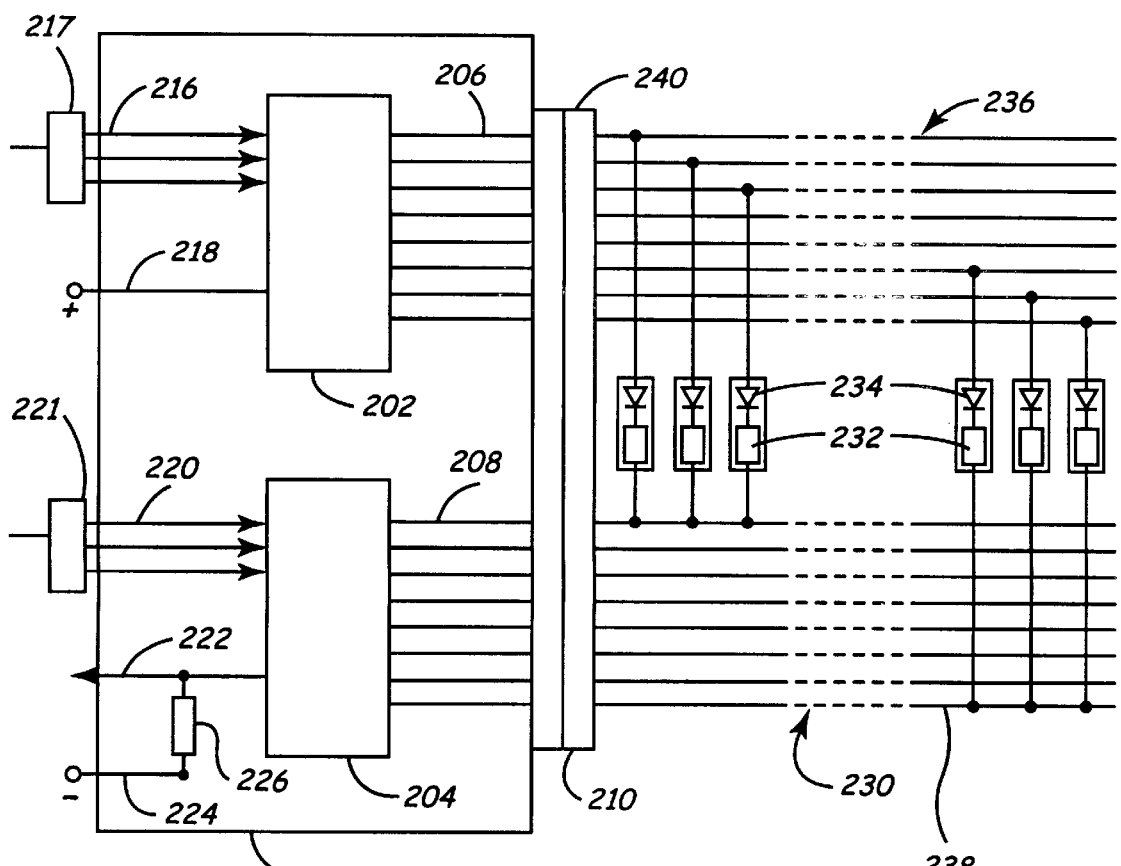
FIG. 7 is a schematic view of a sensor array cable connected to a decoder, in which the sensors are two wire sensors.

A particular embodiment of a coder and a multi-point sensor array cable is shown in FIG. 7. This embodiment is suitable for use with 2-wire sensors. Coder 200 includes two eight-connection multiplexers 202, 204. Multiplexer 202 is connected to eight wires of first wire group 206, and multiplexer 204 is connected to eight wires of a second wire group 208. Wire groups 206, 208 lead to a wire connector 210.

Multiplexer 202 has an address connection 216, which is a three pin connection, as shown in FIG. 7. Three binary pins can be used to control access to eight ($2^3$) connections of a multiplexer. The address connection can be connected to the processor directly or through a counter 217 for sequential incrementing through the wires connected to the multiplexer. Multiplexer 202 is connected to the positive voltage of the power supply with wire 218. Similarly, multiplexer 204 has an address connection 220, which is a three pin connection, as shown in FIG. 7. Address connection 220 can be directly connected to the processor or through a counter 221 for sequential incrementing through the wires connected to the multiplexer. Multiplexer 204 is connected to an output line 222 that leads to an A/D converter. The negative voltage of the power supply is connected by wire 224 through a resistor 226 to output line 222.

Multi-point sensor array cable 230 includes 64 sensors 232. As shown in FIG. 7, only six of the 64 sensors are shown, for simplicity. In this embodiment, each sensor 232 is associated with a corresponding rectifier 234. Sensors 232 are connected on one side to a first group of eight wires 236 and on the other side to a second group of eight wires 238. First group of wires 236 connect to wire group 206 of coder 200, and second group of wires 238 connect to wire group 208 of coder 200. Wire groups 236 and 238 join to connector 240, which mates with connector 210 to link coder 200 with multi-point sensor array 230.

With the WinSystem™ processor, a 64-point sensor array was constructed with digital outputs of the processor used to address the multiplexers. A corresponding array with 256 sensors was constructed with two four-bit counters, model MM74HC161N from Digi-Key Corp. This array included two 16 line multiplexers, which is a generalization of the 8 line multiplexers shown in FIG. 7. The output terminals of the counters were connected to the address terminals of the two 16-channel multiplexers, models MAXC06CPI, from Digi-Key Corp. Pulses from the processor are used to increment the counters. In this way, the connections to each multiplexer can be sequentially incremented.

For example, initially the counters provide a 0,0 address to the multiplexers, respectively. A pulse from the processor to the first counter increments the address to access sensor 0,1. When the first counter reaches its maximum (0,15), the processor sends pulses to such that the first counter resets to 0 and the second counter increments to 1 (1,0). This process is continued until all the sensors are accessed. Then, the process can be repeated.

Figure 8:
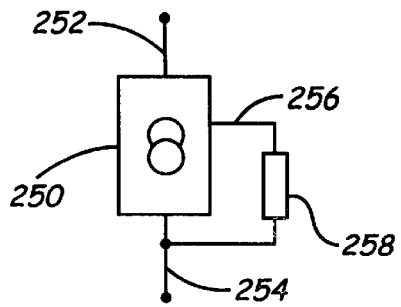
FIG. 8 is a schematic showing a three terminal sensor connected as a two terminal sensor by connecting the output terminal to the negative terminal through a resistor.

FIG. 8 is schematic indicating how a three wire temperature sensor can be connected into a cable designed for two wire sensors, such as shown in FIG. 7. Three wire sensor 250 is connected to a wire 252 at its positive terminal and a wire 254 at its negative terminal. Wire 256 connects the output terminal of sensor 250 with wire 254 through resistor 258.

A sensor matrix was constructed with three terminal adjustable current sensors model LM334H from Digi-Key, Corp., Thief River Falls, Minn. These sensors were connected with an external current programming resistor, as shown in FIG. 8. The resistor can change the current output from $10^{-6}$ to $10^{-2}$ Amps. Good results were obtained with a 226 ohm, 0.1% 15 ppm precision WELWYN resistor from Farnell Corp., Chicago, Ill. The LM334H sensors were used in a sensor array with 1N4004 diodes. Without the diodes, the temperature sensors had reverse currents near $1.5 \times 10^{-6}$ Amps. Without the diodes, no more than eight sensors could be used while obtaining reasonable results. With the diodes, more than 1000 sensors could be used in a single array.

Figure 9:
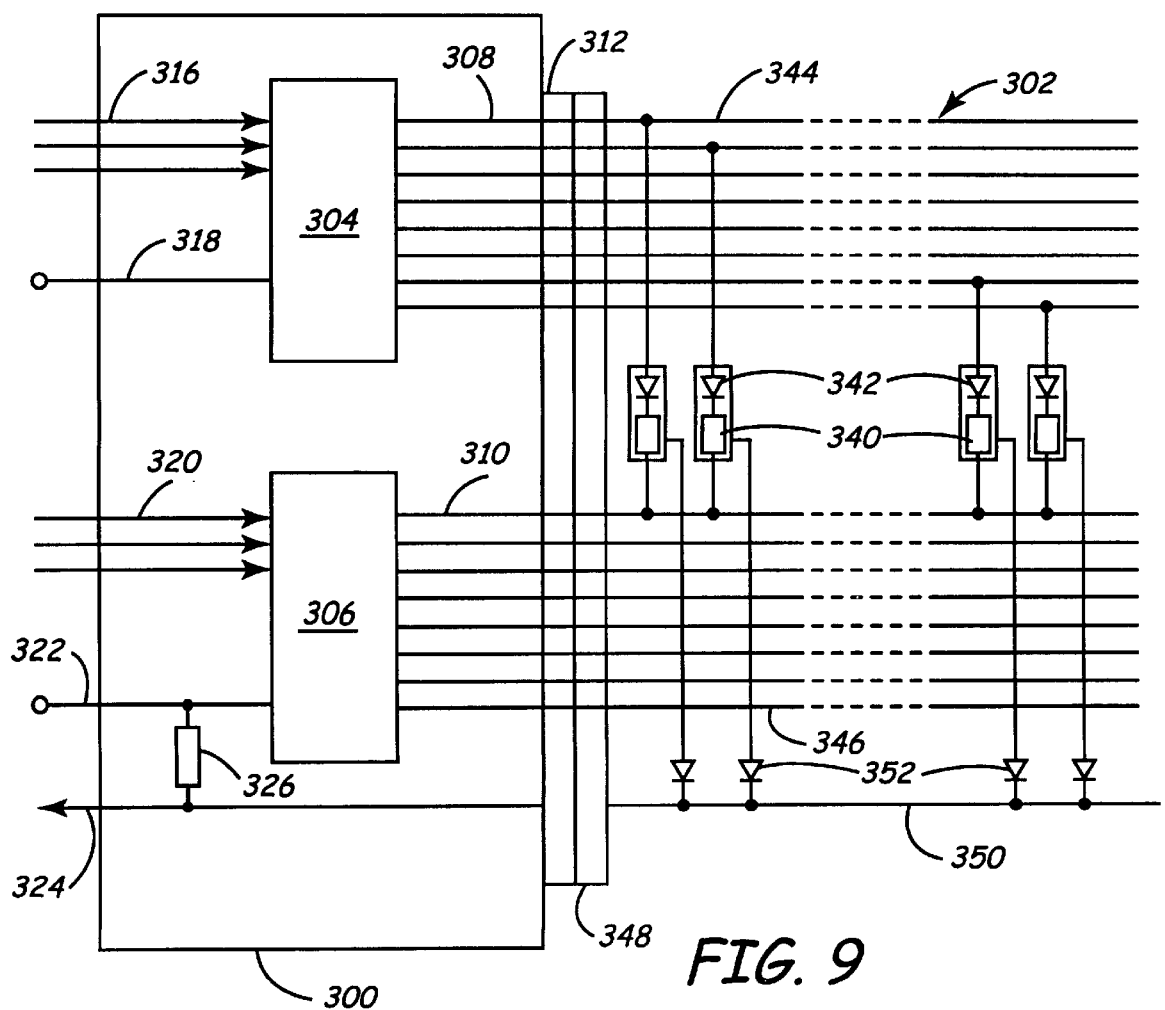
FIG. 9 is a schematic view of a sensor array cable connected to a coder, in which the sensors are three wire sensors.

An embodiment of a coder and a multi-point sensor array cable for a three wire sensor is shown in FIG. 9. Coder 300 is connected to multi-point sensor array cable 302. Coder 300 includes two eight-connection multiplexers 304, 306. Multiplexer 304 is connected to eight wires of first wire group 308, and multiplexer 306 is connected to eight wires of a second wire group 310. Wire groups 308, 310 lead to a wire connector 312.

Multiplexer 304 has an address connection 316, which is a three pin connection, as shown in FIG. 9. Multiplexer 304 is connected to the positive voltage of the power supply with wire 318. Similarly, multiplexer 306 has an address connection 320, which is a three pin connection, as shown in FIG. 9. Multiplexer 306 is connected to the negative voltage of the power supply with wire 322. An output line 324 leads to an A/D converter. Output line 324 is connected to wire 322 through a resistor 326. Output line 324 can connect with connector 312 or to a separate connector or directly to multi-point sensor array cable 302.

Multi-point sensor array cable 302 includes 64 sensors 340. As shown in FIG. 7, only six of the 64 sensors are shown, for simplicity. In this embodiment, each sensor 340 is associated with a corresponding rectifier 342. Sensors 340 are connected on one side to a first group of eight wires 344 through one rectifier 342, and on the other side to a second group of eight wires 346. First group of wires 344 connect to wire group 308 of coder 300, and second group of wires 346 connect to wire group 310 of coder 300. Wire groups 344 and 346 join to connector 348, which mates with connector 312 to link coder 300 with multi-point sensor array 302.

Multi-point sensor array cable 302 further includes a signal line 350. Signal line 350 connects to sensors 340 through a second group of rectifiers 352. Signal line 350 connects with output 324 of coder 300, such that the signal is directed to the A/D converter. Signal line 350 can lead to connector 348, a separate connector or directly to output 324.

Based on the specific examples shown in FIGS. 6 and 9, the structure can be generalized for a greater number of sensors with correspondingly larger multiplexer capacity.

Figure 10:
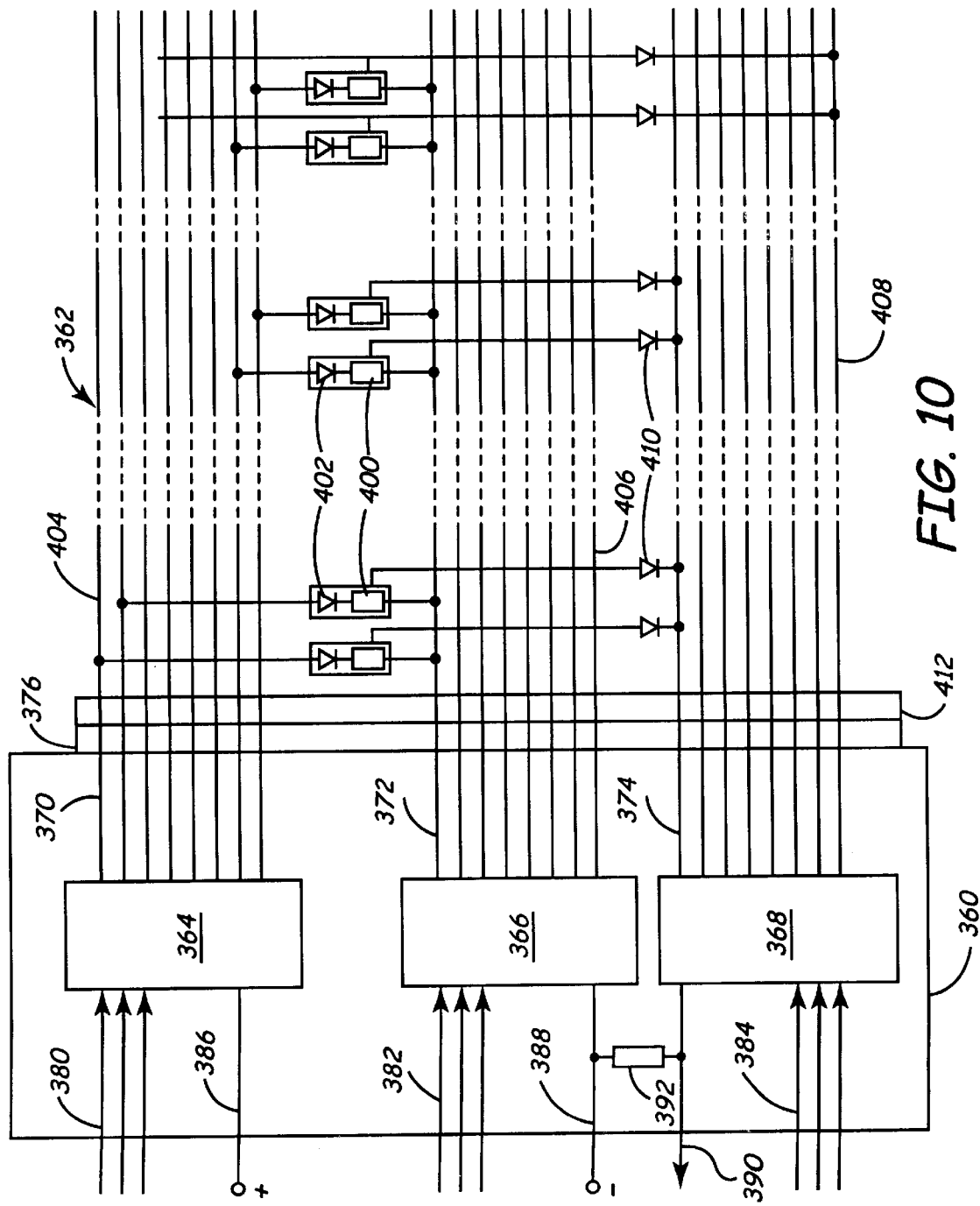
FIG. 10 is a schematic view of a sensor array cable connected to a coder, in which the sensors are three wire sensors connected in a three dimensional matrix connection array.

A coder 360 and multi-point sensor array cable 362 for a sensor array with a three dimensional matrix connection array is shown in FIG. 10. Coder 360 includes three multiplexers 364, 366, 368. Multiplexers 364, 366, 368 are connected respectively to groups of wires 370, 372, 374. Groups of wires 364, 366, 368 join with a connector 376. Multiplexers 364, 366, 368 are connected to wires 380, 382, 384 that provide the respective address of the multiplexer to be accessed. Multiplexer 364 is connected to the positive pole of a power supply with wire 386. Multiplexer 366 is connected to the negative pole of a power supply with wire 388. Multiplexer 368 is connected to output line 390. Output line 390 is connected to the negative pole of the power supply through a resistor 392. Output line 390 connects to an A/D converter for performing the measurement.

Multi-point sensor array cable 362 includes 512 sensors 400. As shown in FIG. 10, only six of the 512 sensors are shown, for simplicity. Each sensor 400 is associated with a corresponding rectifier 402. Sensors 400 are connected on their positive terminals to a first group of eight wires 404 through a rectifier 402, and on their negative terminal to a second group of eight wires 406. The output terminals of sensors 400 are connected to third group of wires 408 through a second group of rectifiers 410. First group of wires 404 connect to wire group 370 of coder 360, second group of wires 406 connect to wire group 372 of coder 360, and third group of wires 408 connect with wire group 374 of coder 360. Wire groups 404, 406 and 408 join to connector 412, which mates with connector 376 to link coder 360 with multi-point sensor array 362.

Figure 11:
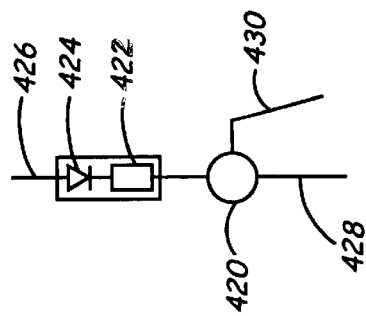
FIG. 11 is a schematic view of a sensor connected with a switch in series for producing a three terminal sensor for connection in a three dimensional matrix connection.

As noted above, a two terminal sensor can be connected to a three dimensional matrix connection array using a switch. Referring to FIG. 11, switch 420 is placed in series with a sensor 422 and a rectifier 424. These components in series are connected at their positive terminals to a wire 426 that connects to a first group of wires, such as wires 404 in FIG. 10. Similarly, the components in series are connected at their negative terminals to a wire 428 that connects to a second group of wires, such as wire group 406 in FIG. 10. The control terminal of switch 420 is connected to wire 430 that connects with a third group of wires, such as wire group 408 of FIG. 10. In these embodiments, the third multiplexer is connected to a voltage supply suitable to trigger the switch. A plurality of switches in series can be used to construct higher dimension connection arrays.

Figure 12:
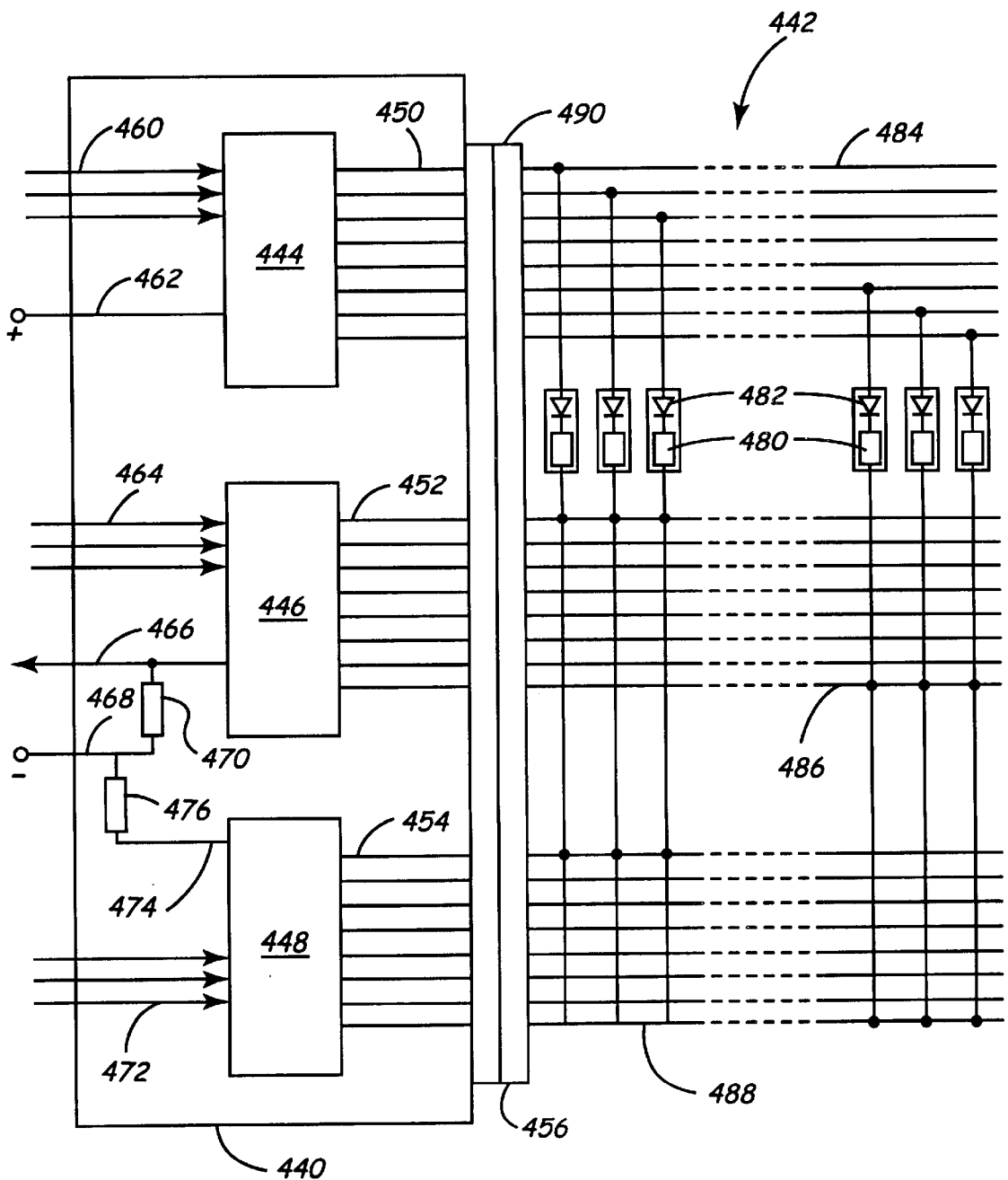
FIG. 12 is a schematic view of a sensor array connected to a coder, in which two terminal sensors are connected through three multiplexers such that sensors not being used for a measurement can be warmed up.

A particular embodiment of a coder 440 and a multi-point sensor array cable 442 capable of preheating sensors prior to performing a measurement is shown in FIG. 12. Coder 440 includes three eight-connection multiplexers 444, 446, 448. Multiplexer 444 is connected to eight wires of first wire group 450, multiplexer 446 is connected to eight wires of a second wire group 452, and multiplexer 448 is connected to eight wires of a third wire group 454. Wire groups 450, 452, 454 lead to a wire connector 456.

Multiplexer 444 has an address connection 460. Multiplexer 444 is connected to the positive voltage of the power supply with wire 462. Similarly, multiplexer 446 has an address connection 464 and is connected to an output line 466 that leads to an A/D converter. The negative pole of the power supply is connected by wire 468 through a resistor 470 to output line 466. Multiplexer 448 has an address connection 472 and is connected by wire 474 through a resistor 476 to the negative pole of the power supply at wire 468.

Multi-point sensor array cable 442 includes 64 sensors 480. As shown in FIG. 12, only six of the 64 sensors are shown, for simplicity. Each sensor 480 is associated with a corresponding rectifier 482. Sensors 480 are connected by their positive terminals to a first group of eight wires 484 and by their negative terminals to a second group of eight wires 486 and to a third group of eight wires 488. The wires of second group 486 and third group 488 are connected in parallel. First group of wires 484 connect to wire group 450 of coder 440, second group of wires 486 connect to wire group 452 of coder 440, and third group of wires 488 connect to wire group 454 of coder 440. Wire groups 484, 486, 488 join to connector 490, which mates with connector 456 to link coder 440 with multi-point sensor array 442.

Multiplexer 448 is used to preheat sensors prior to measurements. In contrast with multiplexers 444 and 446, multiplexer 448 supplies current to all but one of the wires connected to it. The address supplied to multiplexer 448 instructs the multiplexer which line should be off rather than on. For example, if the address of the first wire is given to multiplexer 448, voltage is supplied to wires 2–8. The resulting current, though, is not measured. The same address is input to multiplexers 446 and 448. Thus, at any point in time, power is being supplied to eight sensors connected to a particular wire addressed by multiplexer 444. One of the eight sensors is being read through sensor 446. The other seven are being supplied power for pre-heating without being measured through multiplexer 446.

Figure 13:
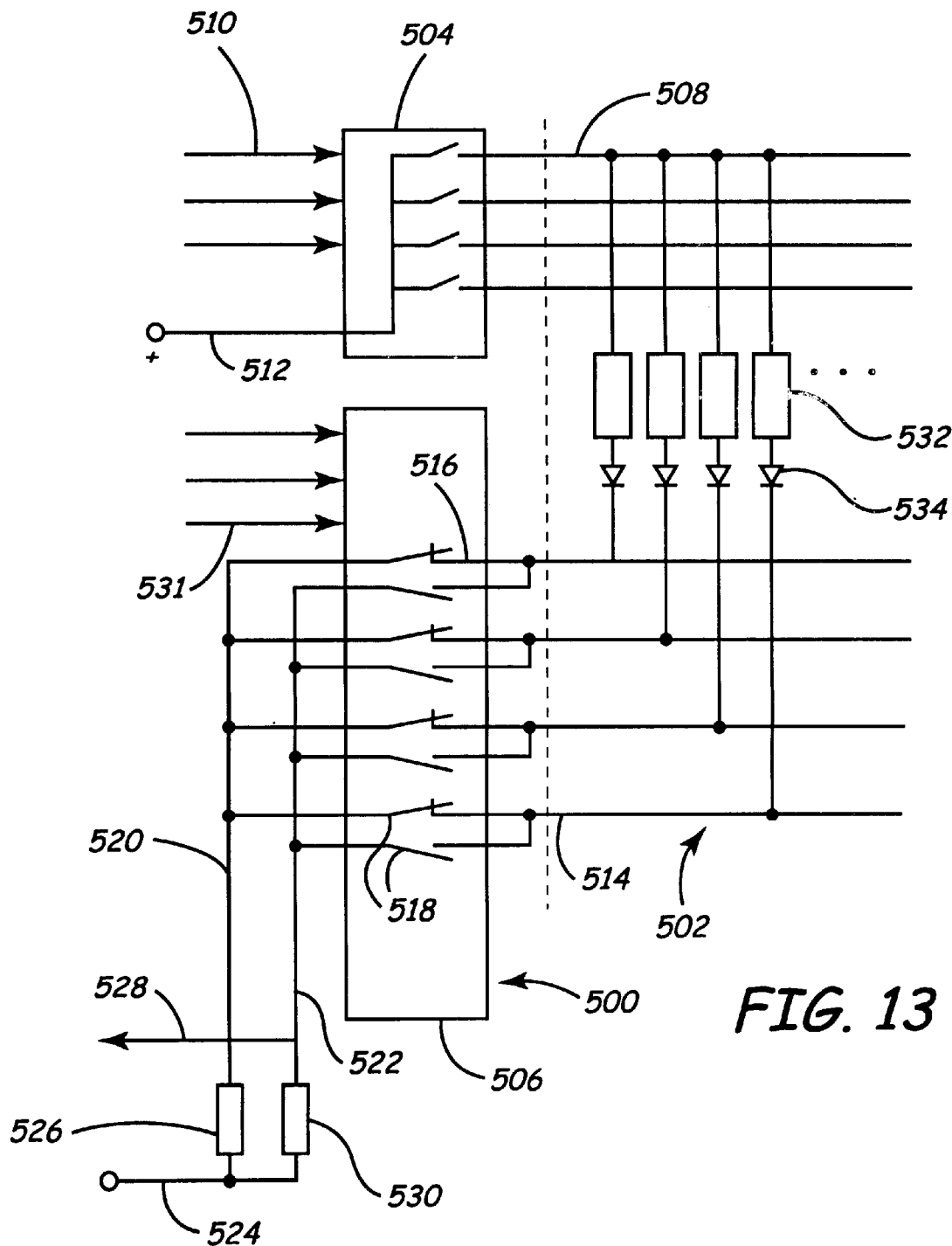
FIG. 13 is a schematic view of a sensor array connected to a coder, in which two terminal sensors are connected through a multiplexer and a switch that addresses one line for output while providing current to other lines such that sensors not being used for a measurement can be warmed up.

An alternative embodiment for preheating the sensors is shown in FIG. 13. Coder 500 is directly connected to multi-point sensor cable 502. Coder 500 includes a four line multiplexer 504 and a four line switch 506. Multiplexer 504 is connected to a four wire group 508. Multiplexer also connects with an address wire 510 and with the positive pole of a power supply through wire 512.

Switch 506 is connected to a four wire group 514. Each wire of wire group 514 splits into two bifurcated connections 516 within switch 506. Two alternative relays 518 are positioned to alternatively select one connection of the bifurcated connections 516. The top connection of each relay 518 joins a warm-up line 520, while the bottom line of each relay 518 joins an output line 522. Warm-up line 520 connects with the negative pole of the power supply with wire 524 connected through warm-up resistor 526. Output line 522 connects with output line 528 and with the negative pole of the power supply through wire 524 connected through load resistor 530. Switch 506 is also connected to an address line 531. When an address is input into switch 506, closes the bottom relay corresponding to that address and opens the top relay. For the non-addressed relays, the bottom relay is open and the top relay is closed such that current flows to the sensors to warm them, but the current is not direct to the A/D converter for these sensors to make a measurement.

Multi-point output line 502 includes first wire group 508 and second wire group 514 that connect with coder 500, as described above. Multi-point sensor cable 502 includes 16 sensors, of which four two wire sensors 532 are shown in FIG. 13. Sensors 532 are connected between one line of wire group 508 and one line of wire group 514. Sensors 532 are connected such that no two sensors 532 are connected to the identical two wires. Rectifiers 534 are connected in series with sensors 532.

The two addresses input into coder 500 determine the particular sensor to be accessed corresponding to the two wires with the respective addresses. Switch 506 provides voltage to all of the lines of wire group 514 while measuring current from only one line, based on the address. Thus, the three other sensors connected to the addressed wire of wire group 508 are warmed up while one sensor is measured based on the addressed wire of wire group 514.

In FIG. 12, multiplexers 446 and 448 together function as a selector. Thus, power is supplied to all of the wires of wire group 488, but only the current from a selected wire is directed to an output wire. Similarly, in FIG. 13 switch 506 functions as a selector. While power is supplied to all of the wires in group 514, only the current from one selected wire is directed to an output line for measurement.

In addition, it may be desirable to introduce a individual address terminals on each sensor in the array to provide additional addressing to further reduce the number of wires. This can be particularly desirable for embodiments with a large sensor array. To implement these embodiments, an addressable switch is associated with each sensor. Using wires that carry a binary signal, K address wires increase the capacity of the cable with respect to the number of sensors by a factor of $2^K$.

Figure 14:
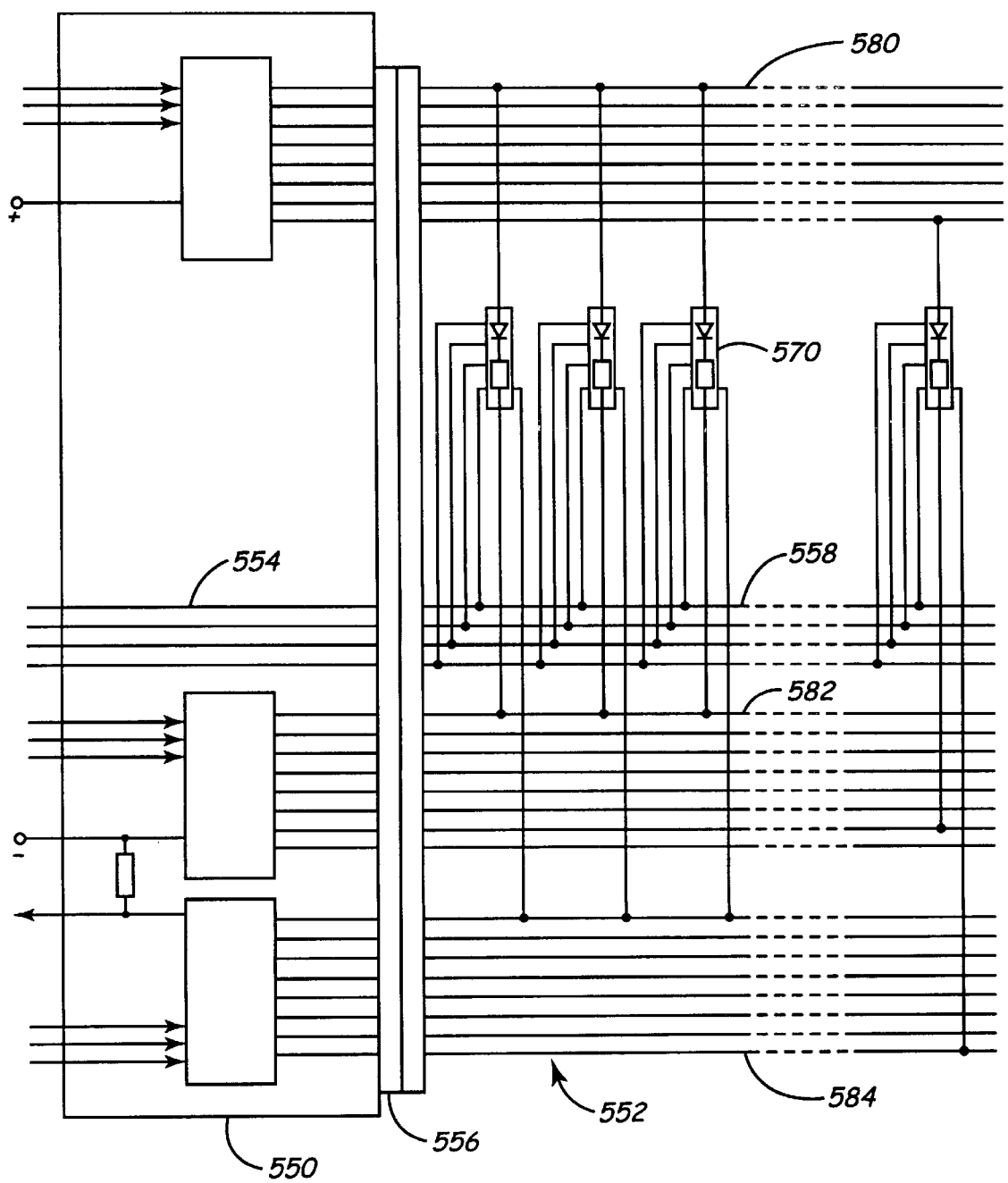
FIG. 14 is a schematic view of a sensor array cable connected to a coder, in which the sensors are three wire sensors connected in a three dimensional matrix connection array and in which separate address wires are included in the cable for operating an addressable switch associated with each sensor.

For example, a sensor array with a three dimensional matrix connection array with eight wires in each dimension of the connection connected to a multiplexer and with four wires connected through a four address switch connected with each sensor can carry $8 \times 8 \times 8 \times 2^4$ sensors for a total of 8192 sensors. An embodiment with this arrangement is shown in FIG. 14. In FIG. 14, a coder 550 is connected to multi-point sensor array cable 552. Coder 550 is the same as the coder 360 in FIG. 10 except for the addition of four address wires 554 that join connector 556. Multi-point sensor array cable 552 is similar to the multi-point sensor array cable 362 of FIG. 10 except for the addition of four address wires 558 and addressable switches associated with each sensor. Address wires 558 are jointed to connector 560 such that address wires 558 connect with address wires 554 of coder 550.

Figure 15:
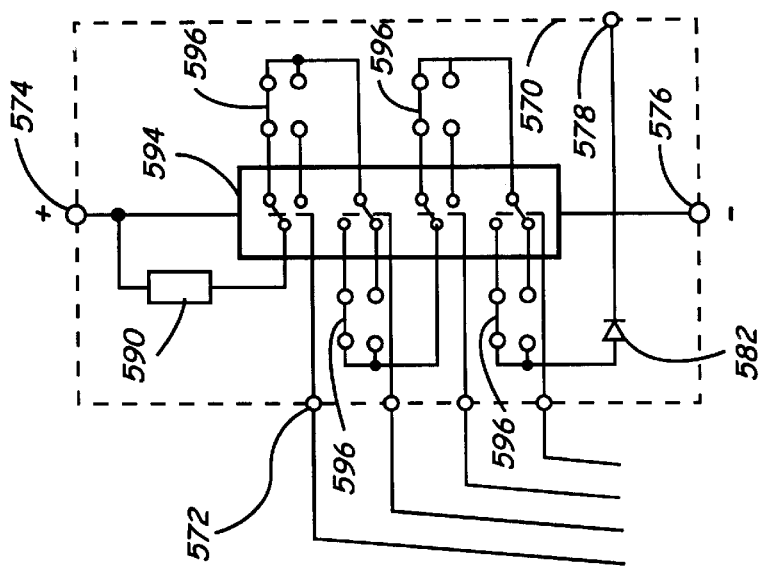
FIG. 15 is a schematic diagram of a sensor unit including an addressable switch associated with a sensor.

Address wires 558 are connected in parallel with a plurality of sensor units 570. Each sensor unit 570 includes a sensor, a diode and an addressable switch. A representative structure for sensor unit 570 is shown in FIG. 15. Sensor unit 570 includes address terminals 572, a positive terminal connection 574, a negative terminal connection 576 and an output terminal 578. Address terminals 572 connect with address wires 558. Positive terminal 574 connects with a group of wires 580, as shown in FIG. 14. Similarly, negative terminal 576 connects with a group of wires 582, and output terminal 578 connects with another group of wires 584. Wire groups 580, 582, 584 are part of a matrix connection array as described above with respect to FIG. 10.

Sensor unit 570 further includes a sensor 590, a rectifier 592 and an addressable switch 594. Addressable switch 594 includes sensor address jumpers 596, which can be placed in one of two positions. The position of the address jumpers 596 determine the address to open the switch. For example, with all of the address jumpers in the up position, the switch is opened by the address 0,0,0,0. Suitable addressable switches include, for example, a four channel SPDT analog switch, such as model MAX333CPP available from Digi-Key Corp. When positive and negative voltages are applied across the positive terminal 574 and negative terminal 576, and the proper digital address signal is supplied, the switch opens to allow current to flow in the output line. The supply of current and reading of the output current is controlled by the matrix connection array. Thus, control is provided both by the addressable switch and the matrix connection array.

As described further below, some sensors require calibration values to correlate an output current or voltage with corresponding measurements. In circumstances where a user has a number of sensor arrays, maintaining the proper calibration parameters may be burdensome. To simplify the calibration for a particular multi-point sensor array cable, a non-volatile memory unit can be attached to the cable. Non-volatile memory can be added to any of the cable designs described above.

Figure 16:
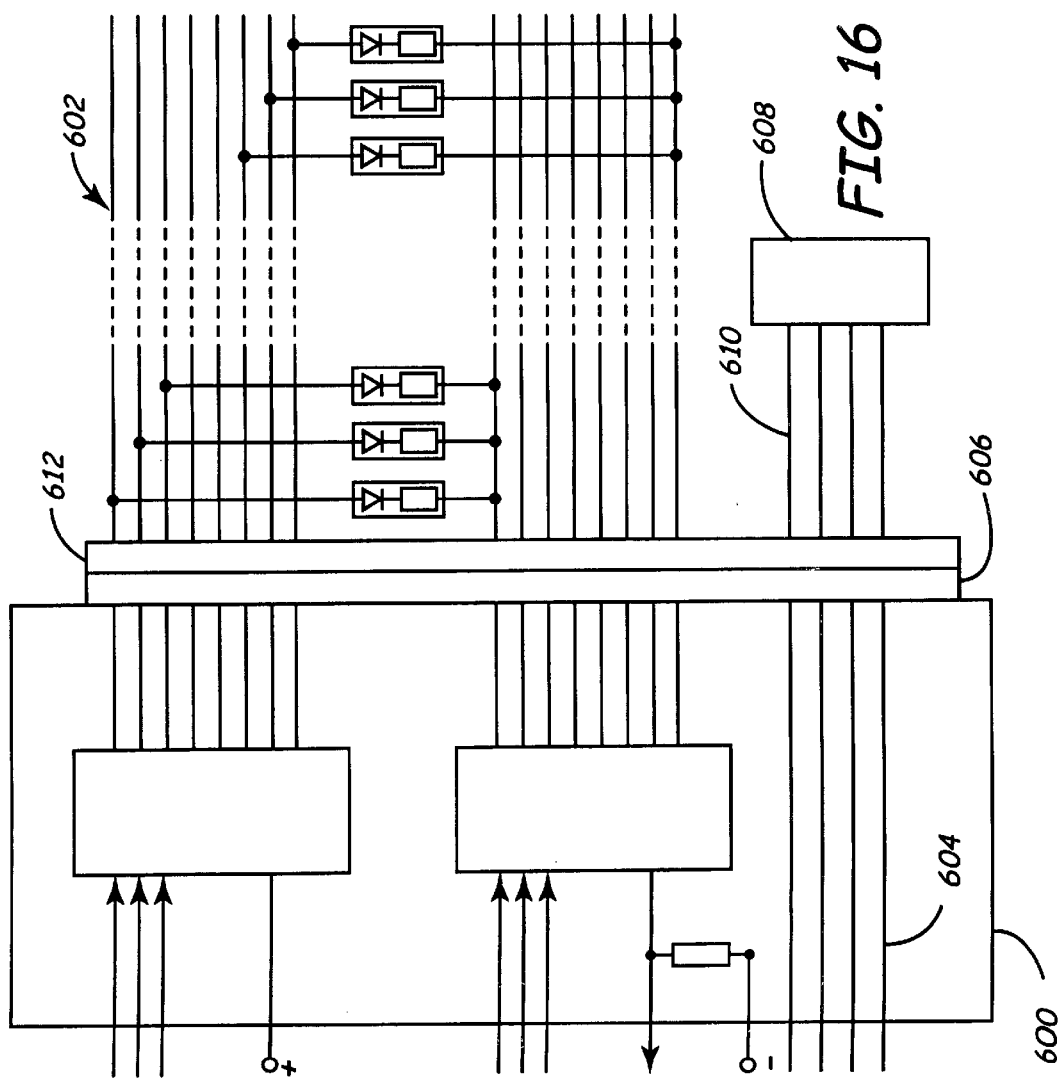
FIG. 16 is a schematic diagram of a sensor array cable connected with a coder in which the cable includes non-volatile memory for storage of calibration information.

Referring to FIG. 16, a coder 600 is connected to a multi-point sensor array cable 602 with nonvolatile memory. Coder 600 and cable 602 are adapted from the coder and cable shown in FIG. 7. In comparison with coder 200 of FIG. 7, coder 600 includes memory access wires 604 joining connector 606. Wires 604 directly or indirectly are connected with a processor. In comparison with cable 230 of FIG. 7, cable 602 further includes non-volatile memory 608 and memory access wires 610. Memory access wires 610 join connector 612. Connector 612 mates with connector 606 to link wires 604 with wires 610. Non-volatile memory 608 can be any suitable memory unit. Suitable memory units include, for example, serial EEPROMS, such as Microchip Technology 4k CMOS EEPROM 2.5V, part number 24LC04B/P-ND, available from Digi-Key Corp. Thief River Falls, Minn.

The calibration information for each relevant sensor of the cable can be stored in the non-volatile memory using a processor following the calibration step. This information can be stored in the cable for use when the cable is connected to the measurement apparatus through a coder. With the non-volatile storage, the cables do not have to be carefully marked such that calibration information can be correlated with a particular cable when used. If a cable is recalibrated, the stored calibration information can be refreshed.

B. Use of Sensor Array

A sensor array, as described in the previous section, can be positioned to perform desired measurements. Once the sensors are positioned as desired, the processor can be instructed to perform various real time measurements. The measurement approaches have in common that at any particular point in time, the processor can select a measurement from one particular sensor by sending the corresponding addresses to the multiplexers.

Thus, the measurement of a particular sensor can be obtained at any time period by sending the corresponding address information to the multiplexers. This can form the basis for a variety of real time measurement procedures. One particular procedure is discussed further, and other procedures can be constructed analogously, as desired. Various measurement procedures can be constructed to meet particular objectives based on the versatile properties of the sensor array.

Figure 17:
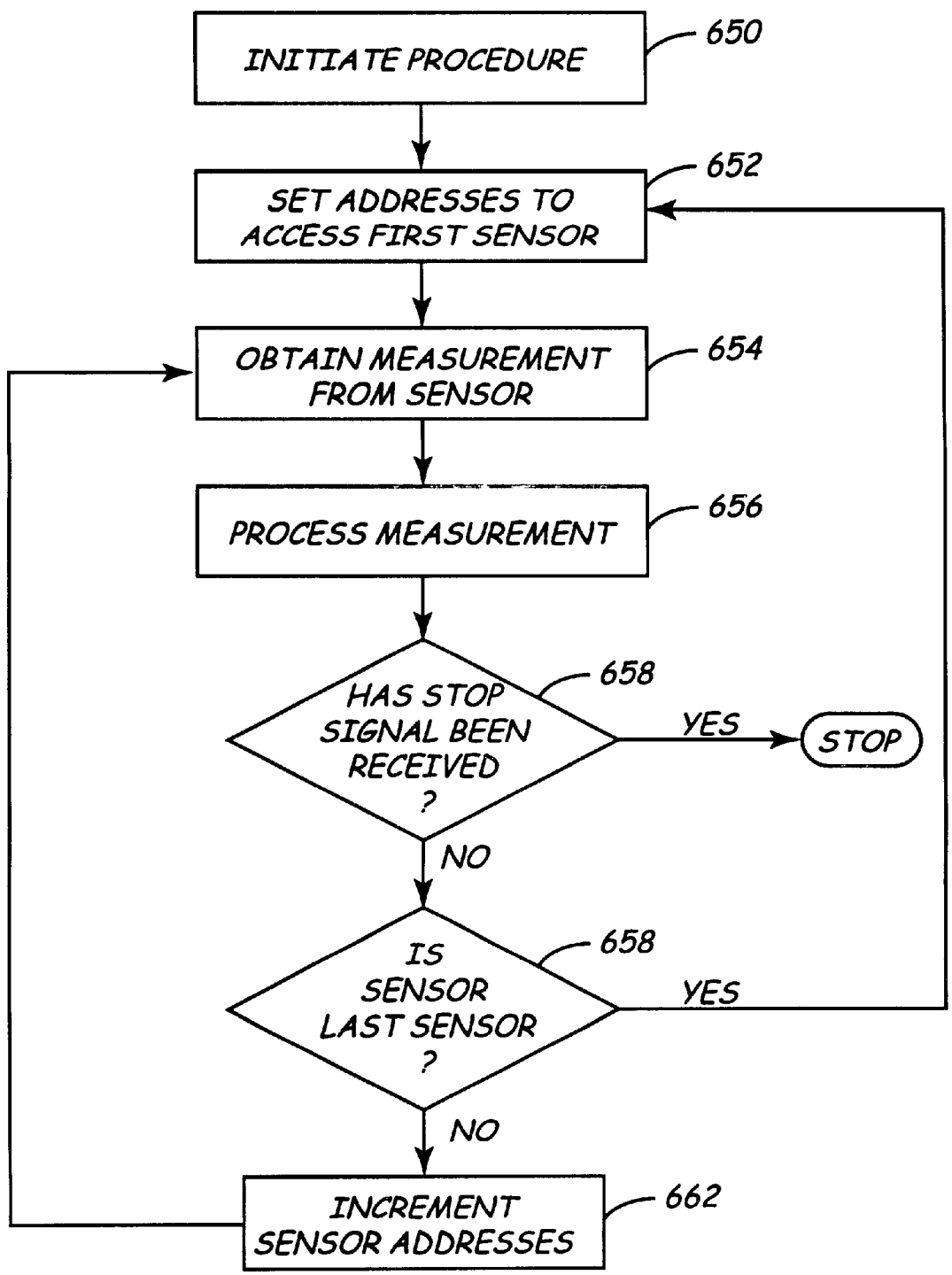
FIG. 17 is a flow diagram of an embodiment of the measurement process using the sensor array.

A representative procedure is outlined in a flow diagram in FIG. 17. This procedure involves obtaining the continuous, sequential measurements of the sensors in real time. Sequential addressing of a group of sensors using counters is described above. First, the procedure is initiated 650. The multiplexer addresses are set 652 to values for the first sensor in the array. The measurement is obtained 654 from the sensor. Generally, a period of time must be used to access an accurate measurement from the sensor depending on the response time of the sensor, A/D converter and any other components in the measurement circuit. Preheating of the sensor can be used to reduce this time, as described above. After waiting at least this minimum period of time, the processor obtains the sensor measurement from the A/D converter.

The measurement is then processed 656. This processing can involve correlating a sensor current value with a corresponding measurement of the physical parameter based on the calibration of the sensor. Calibration is described further below. The processing can further involve display of the result, either numerically or graphically and/or storage of the result for further analysis, such as a statistical analysis or analysis of the distribution.

After the measurement is processed, it is determine whether a stop signal has been received 658. If a stop signal has been received, the procedure is stopped. If a stop signal was not received, it is determined if the sensor addressed was the last sensor of the array 660. If it was the last sensor, the addresses are set 652 to access the first sensor, and the procedure is continued. If the sensor was not the last sensor, the addresses are incremented 662, and the measurement is obtained 654 from the sensor. The process is continued until a stop signal is received.

A current or voltage reading received by the processor is converted into a value for the corresponding measured parameter. Some sensors are precalibrated. In other words, the manufacturers provide a formula or a table connecting the current/voltage reading with the measurement. Alternatively, the sensor can be appropriately calibrated prior to use. To perform the calibration, one or more of the sensors are subjected to known values of temperature, pressure or other condition, and a measurement of the current/voltage is obtained. A correlation table can be constructed from these measurements. Interpolation and/or extrapolation between tabulated values can provide for appropriate measurements. A particular calibration of temperature sensors for underwater measurements is described below.

C. Underwater Temperature Sensor Arrays

In one preferred embodiment, the sensor array is configured for temperature measurements within a body of water. The temperature sensors can be associated with depth sensors so that the temperatures can be correlated with the depth within the water. Similarly, the temperature sensors can be associated with orientation sensors to determine which sensors are lying on the bottom of the body of water. In one particularly preferred embodiment, a hydrophone is attached to the end of the cable supporting the sensors. The temperature measurements can be used to correct the hydrophone readings since the speed of sound varies with temperature.

Figure 18:
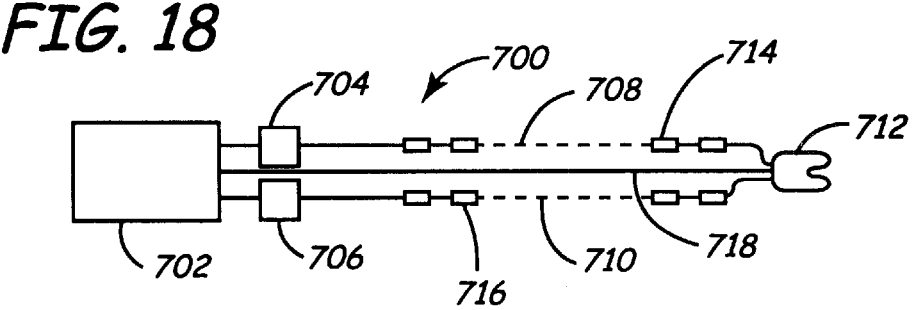
FIG. 18 is a preferred embodiment of a multi-point sensor cable for performing underwater temperature measurements.

Referring to FIG. 18, a preferred embodiment of a sensor array for underwater measurements is shown schematically. Sensor array 700 includes a controller 702, coders 704, 706, multi-point temperature sensor array cable 708, multi-point depth sensor array 710, and hydrophone 712. In preferred embodiments, each temperature sensor 714 is located at the same position as a depth sensor 716. Each sensor 714, 716 generally would be associated with a rectifier and arranged in a matrix connection array, such as one of those shown in FIGS. 7, 9, 10, 12 and 13. As shown in FIG. 18, the temperature sensors and the depth sensors are arranged in separate matrix connection arrays, but they can be integrated into a single matrix connection array if they operate over similar voltage and current ranges. In other words, in a single sensor array, some addresses would access a temperature sensor while other addresses would access a depth sensor. Suitable structures for coders 704, 706 are described above. A hydrophone is placed at the end of the cables and is connected to controller 702 by a wire 718.

Also, temperature sensors 714, depth sensors 716 or both can be connected with orientation sensors, such as the sensor shown in FIG. 6. With an orientation sensor place in series with a temperature or depth sensor, sensors lying on the bottom of the body of water generally will be horizontal rather than vertical. When horizontal, the orientation sensor will have an open relay that prevents the flow of current. With an open relay connected in series, the corresponding temperature sensor or depth sensor will not yield a reading. Thus, it would be possible to determine which sensors are located on the bottom of a natural or artificial body of water.

Figure 19:
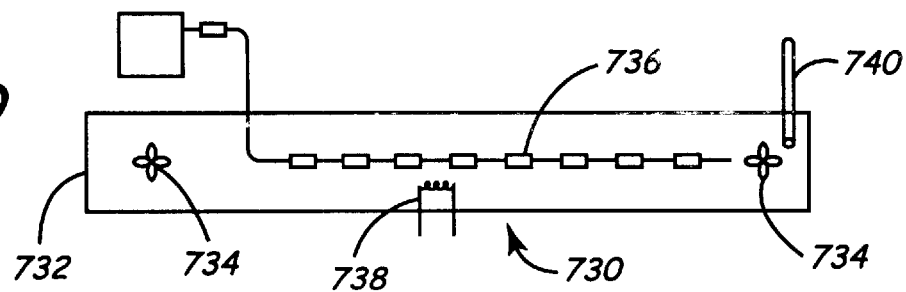
FIG. 19 is a schematic diagram showing an apparatus to calibrate an underwater temperature sensor cable.

If the temperature sensors need to be calibrated, the sensors can be placed in a constant temperature water bath. The water is preferably agitated gently to maintain a constant temperature through the bath. Such an arrangement is shown in FIG. 19. Calibration apparatus 730 includes a tank 732 with water and agitators 734, which can be rotating blades, blower or the like. One or more temperature sensors 736 can be placed in the water for testing. Preferably they are placed into the water connected within the desired multi-point temperature sensor cable. A temperature controller 738 is used to heat or cool the water to achieve a desired temperature. An accurate, calibrated temperature measurement device 740, such as an analog or digital thermometer, provides the temperature reference point. The calibration information can be stored in a non-volatile memory unit in the multi-point sensor cable, as described above.

Figure 20:
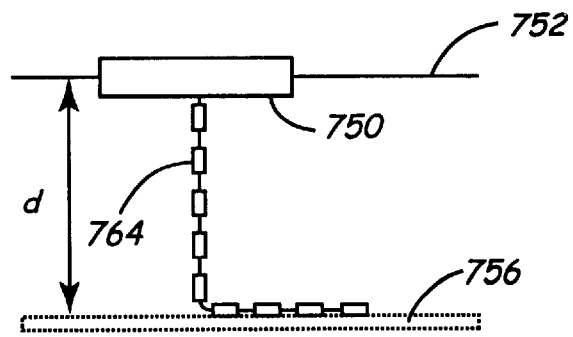
FIG. 20 is a side view of an underwater sensor cable suspended within a body of water.

The underwater sensor array can be towed behind a moving vessel or suspended form a fixed platform. A moving vessel can be a surface vessel or a submarine. If the array is suspended from a fixed platform in calm water, the array will hang straight down into the water. Referring to FIG. 20, a platform 750 floats on the water's surface 752. A multi-point sensor cable 754 hangs down from platform 750. Some of the sensors are shown on the bottom 756 of the body of water. If orientation sensors are included in sensor cable 754, depth "d" can be determined approximately by a cut-off of sensor readings.

Figure 21:
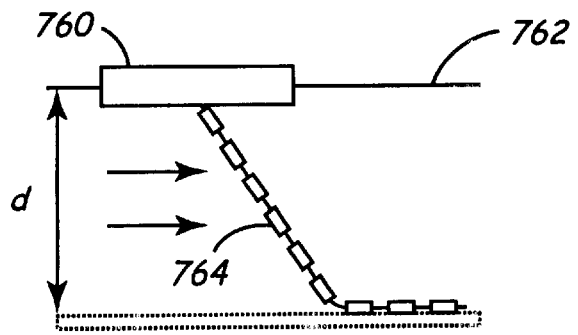
FIG. 21 is a side view of an underwater sensor cable in flowing water.

If the multi-point sensor array is towed behind a moving vessel or is suspended from a fixed platform into a flowing body of water, the sensors can be suspended at an angle due to the flow. Referring to FIG. 21, vessel/platform 760 is located on the water surface 762. Multi-point sensor array 764 is shown at an angle due to relative flow of water indicated with arrows. Due to the angle of the sensor array, a different number of sensors will rest on the bottom of the water than would rest on the bottom without any relative motion.

The embodiments described above are illustrative and not limiting. Additional embodiments are within the claims below. Although the present invention has been described with reference to preferred embodiments, workers skilled in the art will recognize that changes may be made in form and detail without departing from the spirit and scope of the invention.

What is claimed is:

1. A sensor array comprising:

a power supply with two poles;

a plurality of sensors;

a plurality of rectifiers;

a first multiplexer connected to one pole of the power supply, the first multiplexer having (N) outputs;

a second multiplexer connected to a second pole of the power supply, the second multiplexer having (M) outputs;

a first group of wires connected to the first multiplexer and a second group of wires connected to the second multiplexer;

wherein each sensor is connected to one wire of the first group of wires and one wire of the second group of wires;

wherein no two sensors are connected to an identical two wires;

wherein a rectifier is connected in series with each sensor; and wherein the plurality of sensors includes a number of sensors greater than at least one of N and M.

2. The sensor array of claim 1 wherein the power supply is a direct current power supply.

3. The sensor array of claim 1 wherein the plurality of sensors comprises at least 16 sensors.

4. The sensor array of claim 1 wherein the sensors comprise temperature sensors.

5. The sensor array of claim 4 and further comprising a second plurality of sensors, the second plurality of sensors comprising orientation sensors, each orientation sensor being associated with a temperature sensor.

6. The sensor array of claim 4 wherein the temperature sensors are two wire temperature sensors with current output.

7. The sensor array of claim 4 wherein the temperature sensors are negative temperature coefficient thermistors.

8. The sensor array of claim 4 wherein the temperature sensors are three wire temperature sensors with current output.

9. The sensor array of claim 4 wherein the temperature sensors are three wire temperature sensors with voltage output.

10. The sensor array of claim 1 wherein the plurality of sensors comprise pressure sensors, altitude sensors, depth sensors, or combinations thereof.

11. The sensor array of claim 1 wherein the plurality of sensors comprise at least two types of sensors.

12. The sensor array of claim 1 wherein the rectifiers comprise diodes.

13. The sensor array of claim 1 wherein the rectifiers comprise transistors with two terminals of a transistor being connected in series with a sensor.

14. The sensor array of claim 1 wherein the rectifiers have a reverse current less than about $5 \times 10^{-9}$ amps at a voltage of 10 volts.

15. The sensor array of claim 1 wherein the rectifiers have a reverse current less than about $2 \times 10^{-11}$ amps at a voltage of 10 volts.

16. The sensor array of claim 1 wherein the first multiplexer and the second multiplexer are connected to a digital processor that selects the channel in the multiplexer.

17. The sensor array of claim 1 wherein the first multiplexer and the second multiplexer are each connected to a counter that receives pulses from a processor.

18. The sensor array of claim 1 further comprising an analog-to-digital converter connected to the current output from the plurality of sensors.

19. The sensor array of claim 1 further comprising a plurality of addressable switches and address wires connected in parallel to the address terminals of the addressable switches, wherein an addressable switch is connected to each sensor.

20. The sensor array of claim 1 further comprising a two piece electrical connector and non-volatile memory, wherein the sensors, the rectifiers and non-volatile memory are located within a cable unit connected to one element of the connector and wherein the first wire group and the second wire group connect across the electrical connector.

21. A method of performing measurements with a plurality of sensors, the method comprising:

selecting an address for a first multiplexer having (N) outputs and a second multiplexer having (M) outputs to access a single sensor on an array of sensors;

wherein each sensor is uniquely connected to a pair of wires with one wire of the pair from a first group of wires and the second wire of the pair from a second group of wires;

wherein the first group of wires are connected to the first multiplexer and the second group of wires are connected to the second multiplexer;

wherein a rectifier is connected in series with each sensor; and wherein the plurality of sensors includes a number of sensors greater than at least one of N and M.

22. The method of claim 21 wherein the two multiplexers are connected to a digital processor and wherein the digital processor selects a channel of each multiplexer to access a sensor.

23. The method of claim 21 wherein output of the selected sensor is digitized using an analog-to-digital converter.

24. The method of claim 21 further comprising sequentially changing addresses of the multiplexers to access measurements sequentially from the plurality of sensors.

25. The method of claim 21 further comprising supplying current to warm up one sensor while selecting a second sensor to obtain a sensor reading.

26. The method of claim 25 wherein supplying warm up current is performed through an additional multiplexer connected to the sensors in parallel with the first multiplexer.

27. The method of claim 25 wherein supplying warm up current is performed with a switch that supplies current to a group of wires with the current of only one wire being directed to an output wire to perform a measurement.

28. The method of claim 21 wherein temperature measurements are obtained with an accuracy better than about 0.02° C.

29. A sensor array comprising a power supply with two poles, a plurality of sensors, a first multiplexer connected to one pole of the power supply, a selector connected to a second pole of the power supply, a first group of wires connected to the first multiplexer and a second group of wires connected to the selector, wherein each sensor is connected to one wire of the first group of wires and one wire of the second group of wires and wherein no two sensors are connected to an identical two wires, and wherein the selector supplies power to a plurality of the wires of the second group while connecting only one wire of the second group to an output line based on an address provided at an address connection.

30. The sensor array of claim 29 wherein the selector comprises a second multiplexer and a third multiplexer and wherein the third multiplexer is connected to the sensors in parallel with the second multiplexer.

31. The sensor array of claim 30 wherein the third multiplexer is connected to a third group of wires that connect to the sensors in parallel with the second group of wires.

32. The sensor array of claim 30 wherein the third multiplexer is connected to the second group of wires in parallel with the second multiplexer.

33. The sensor array of claim 30 wherein the selector comprises a switch that supplies current to the wires of the second group, and wherein the current from only one wire of the second group is directed to an output line based on an address at an address connection of the switch.

34. The sensor array of claim 29 further comprising a plurality of rectifiers and wherein one rectifier is connected in series with each sensor.

35. A matrix sensor array comprising a power supply with two poles, a plurality of sensors, at least three multiplexers with each multiplexer connected to an output of the power supply, a plurality of groups of wires with one group of wires connected to each multiplexer, wherein each sensor is connected to one wire of one group of wires and one wire of a different group of wires and wherein no two sensors are connected to an identical two wires.

36. The matrix sensor array of claim 35 wherein a rectifier is connected in series with each sensor.

37. An underwater detection grid comprising:
 a plurality of temperature sensors;
 a plurality of position sensors;
 a first multiplexer having (N) outputs;
 a second multiplexer having (M) outputs;
 a first group of wires connected to the first multiplexer and a second group of wires connected to the second multiplexer;
 wherein each temperature sensor is connected to one wire of the first group of wires and one wire of the second group of wires;
 wherein no two temperature sensors are connected to an identical two wires; and
 wherein the plurality of sensors includes a number of sensors greater than at least one of N and M.

38. The underwater detection grid of claim 37 wherein the position sensors are connected in series with the temperature sensors and wherein the position sensors comprise orientation sensors having a relay that is closed when the orientation sensor is upright and open when the orientation sensor is horizontal.

39. The underwater detection grid of claim 37 wherein the position sensors comprise depth sensors.

40. The underwater detection grid of claim 39 wherein a depth sensor is located in close proximity to a temperature sensor.

41. The underwater detection grid of claim 39 wherein the plurality of depth sensors are connected to the same groups of wires as the temperature sensors, and wherein no two depth sensors are connected to the same two wires and no depth sensor and temperature sensor are connected to the same two wires.

42. The underwater detection grid of claim 39 further comprising two additional multiplexers connected to respective poles of a power supply and two additional groups of wires with one of the additional groups of wires being connected to one of the additional multiplexers and the other additional group of wires being connected to the other additional multiplexer, wherein each depth sensor is connected to one wire of the first additional group of wires and one wire of the second additional group of wires and wherein no two depth sensors are connected to the same two wires.

43. The underwater detection grid of claim 37 further comprising a hydrophone.

* * * * *